Figure 1:
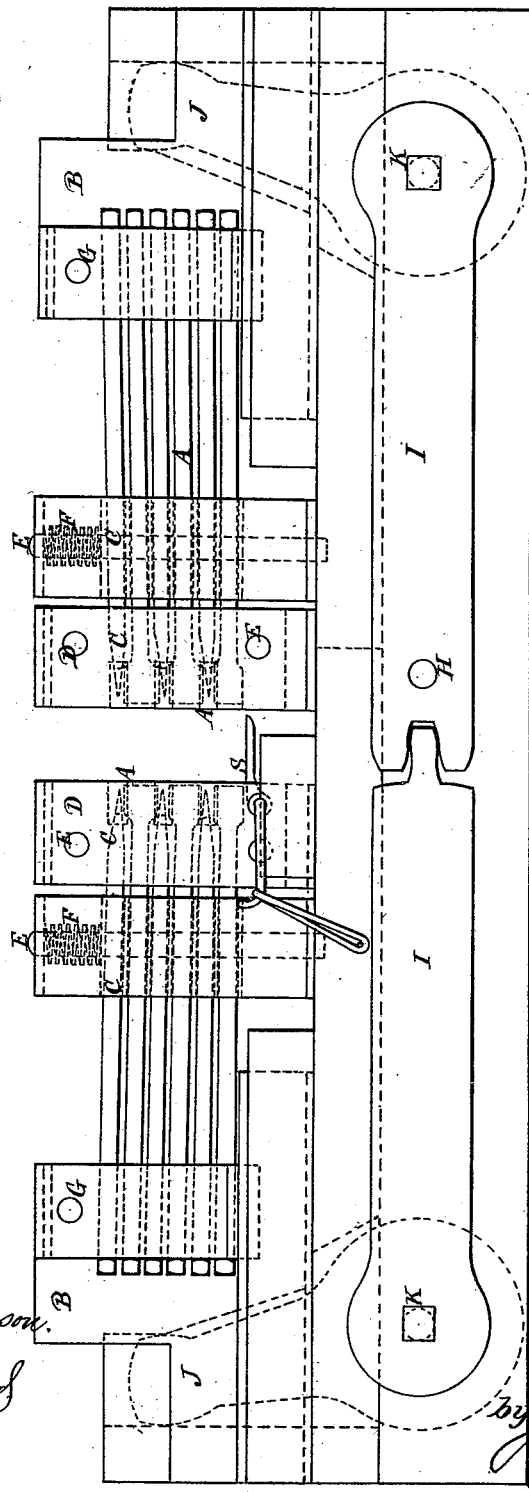

(No Model.)  3 Sheets—Sheet 1.

F. B. McCREA & E. A. COWPER.
Apparatus for Chopping Sugar into Lumps.

No. 229,728.  Patented July 6, 1880.

Witnesses:
Jas. E. Hutchinson.
J. A. Rutherford

Inventors,
F. B. McCrea,
and E. A. Cowper,
by James L. Norris
Att'y.

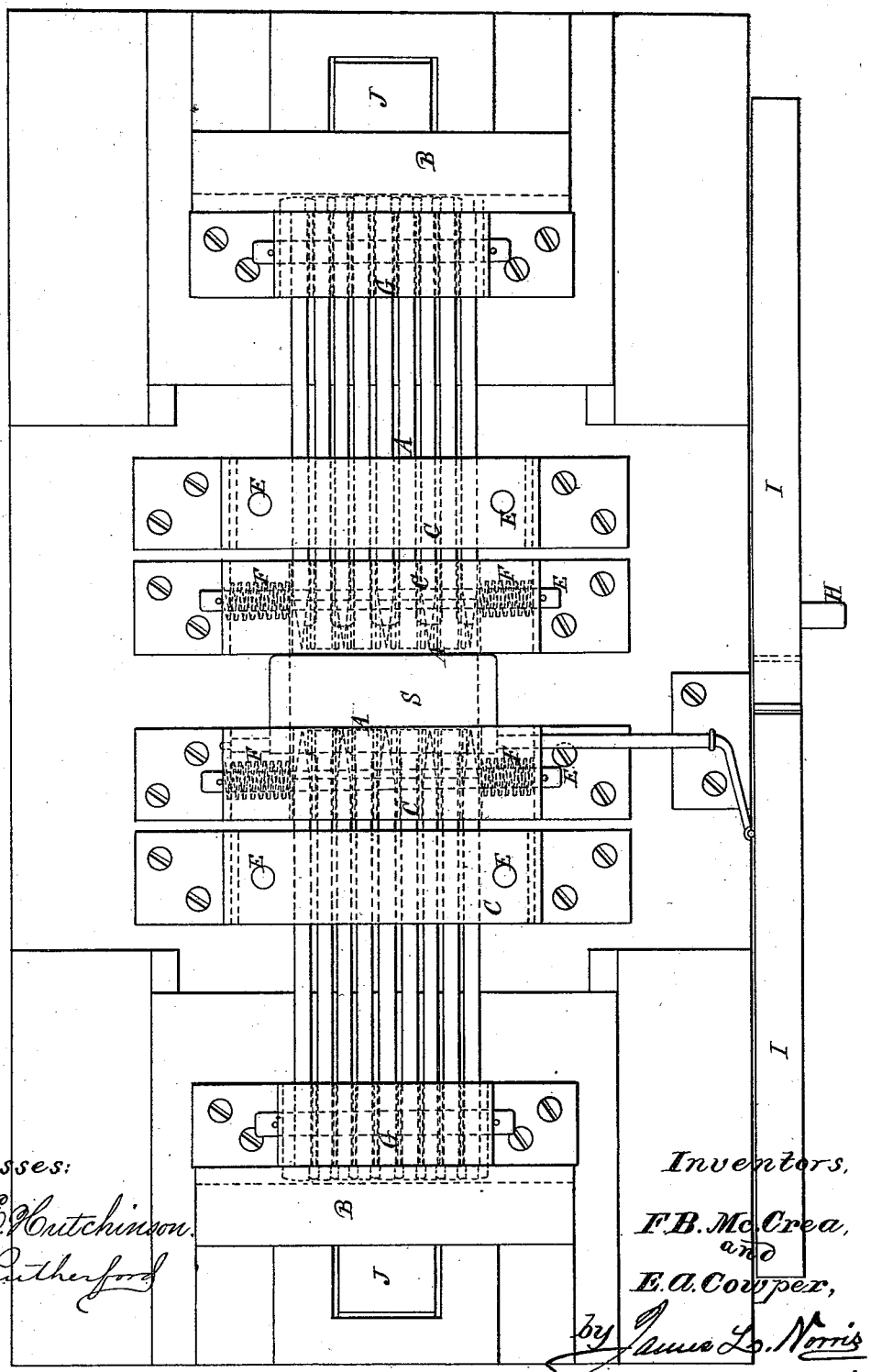

(No Model.)   3 Sheets—Sheet 3.
F. B. McCREA & E. A. COWPER.
Apparatus for Chopping Sugar into Lumps.
No. 229,728.   Patented July 6, 1880.
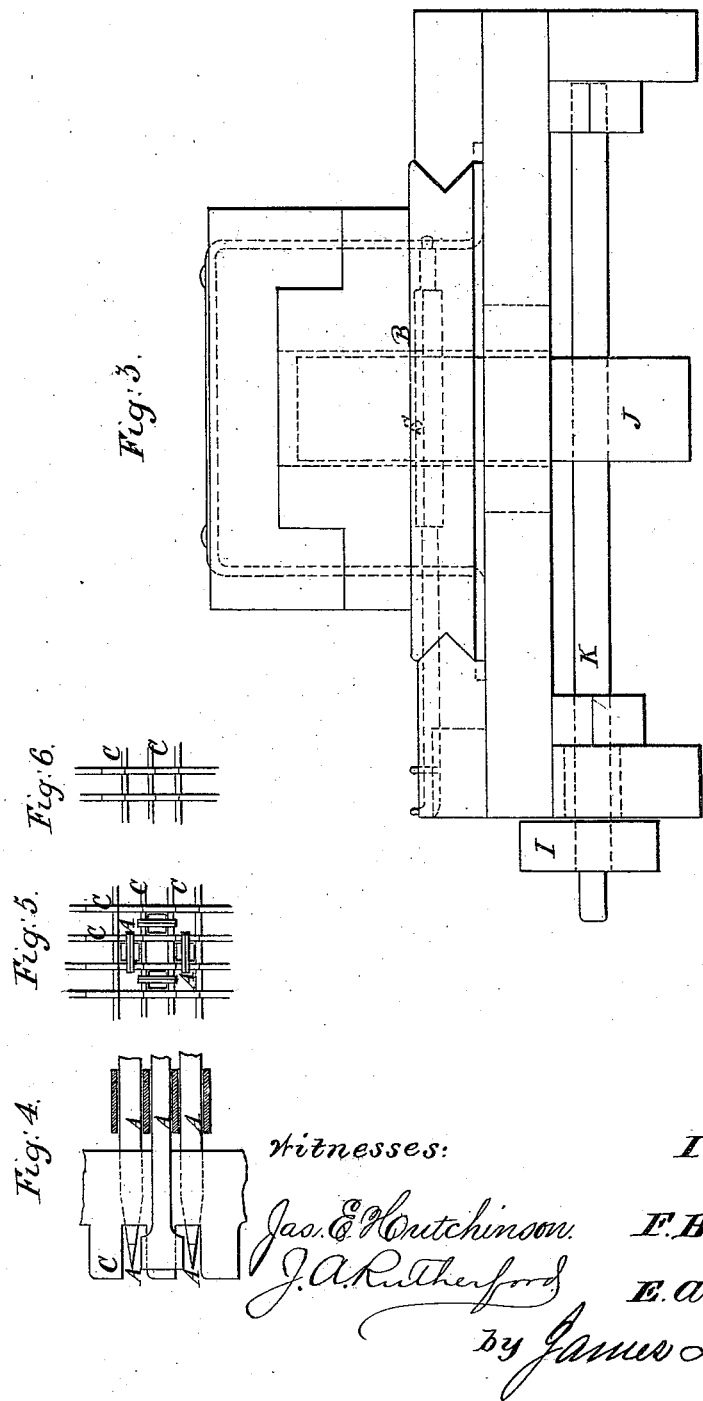
Witnesses:  
Jas. E. Hutchinson  
J. A. Rutherford
Inventors,  
F. B. McCrea and  
E. A. Cowper,  
by James L. Norris.  
Atty.

UNITED STATES PATENT OFFICE.

FREDERICK B. McCREA, OF EALING, AND EDWARD A. COWPER, OF WESTMINSTER, ENGLAND.

APPARATUS FOR CHOPPING SUGAR INTO LUMPS.

SPECIFICATION forming part of Letters Patent No. 229,728, dated July 6, 1880.

Application filed April 6, 1880. (No model.) Patented in England July 16, 1878.

*To all whom it may concern:*

Be it known that we, FREDERICK BRADFORD McCREA, of Ealing, in the county of Middlesex, England, and EDWARD ALFRED COWPER, of Westminster, in the county of Middlesex, England, have invented a new and useful Improved Apparatus for Chopping Sugar into Lumps, for which we have obtained a patent in Great Britain, No. 2,829, bearing date July 16, 1878, and of which the following is a specification.

Our invention relates to apparatus for chopping loaves or slabs of sugar into lumps of suitable size for ordinary use. For this purpose we provide two sets of knives having chisel-edges arranged in squares, and cause them to reciprocate, so that in their advance toward each other they cut or chop a piece of sugar placed between them.

To prevent a crushing effect on the sugar as the knives advance into it, they are made capable of some lateral motion in each direction, so that while they act as wedges separating the sugar into pieces, these pieces are also free to move sidewise apart from each other. After the sugar is thus divided the knives retire between a number of guiding-bars, leaving the lumps of sugar free to fall or to be discharged into a suitable receptacle.

It is convenient to arrange the machine so that the lumps of sugar, after division, shall fall by their own weight, and so get out of the way of fresh pieces of sugar about to be fed in between the knives, for which purpose the knives may work horizontally, the sugar to be chopped being fed in between them either by hand or by an endless band, a chain, or by a pusher or other convenient means, the piece of sugar to be chopped resting on a stop or surface, which is removed when the chopping has been effected. The pieces of sugar to be thus chopped are fed to the chopping-machine in the form of slices, slabs, or cakes, which may have a thickness equal to one dimension of the finished lumps. When these pieces are produced by cutting up a loaf of sugar a machine of similar construction to that above described may be employed for the purpose.

The chopping apparatus may be worked by any convenient power—by a treadle with the feet or by a winch with the hand. The sugar to be fed into the machine is first to be reduced to the form of slices or slabs by any ordinary means—as, for instance, sugar loaves may be split down the middle with a hatchet, and then be cut crosswise, by a common up-and-down chopping-machine, into thick slices of several inches in thickness, and then these slices be again cut through parallel to the first split (as that is the direction of the easiest cleavage) into slices the thickness of one dimension of the finished lumps; or, in place of so treating the sugar loaves, they may be sawed up at once into slices of the thickness of one dimension of the finished lumps; or the sugar may be made in slabs or slices ready for cutting up, or the sugar-loaves may be prepared for cutting up into lumps by hand-chopping or any known means. Then when a slice is dropped into the machine the simultaneous approach of the two sets of knives at once splits it up into the proper-sized lumps without crushing it or producing much dust or powder, and without in any way giving the lumps an opaque white or chalky appearance, so that the finished lumps are of better shape, more bright and sparkling in appearance than when cut with care by hand, and there is less dust made. The quantity that can be thus cut into bright finished lumps by one machine is far greater than can be cut by any other machine or by hand.

The arrangement of the two sets of knives is such that they are not fixed, but are free to move on the ends, as on joints, in either direction. They are pushed forward by a plate behind them, and are drawn back by plates that catch their T-heads, while their front or chisel ends are capable of some lateral motion in each direction, so that while they act as wedges in separating the sugar into lumps the lumps are free to move sidewise apart from each other, the knives also partaking of the same motion, and thus all crushing of the sugar is avoided, and the lumps are cleanly split up by knives acting on each side of the slice and on all four sides of each square lump at the same time, thus producing a large number of finished lumps at each cut.

The knives at no time approach so close as to touch each other, but just penetrate the slice of sugar from each side, so as to split it up.

There is a flap below for the sugar to rest on while being cut, and this flap may be acted on by a cam or a trigger, so as to open at the right time to let the lumps of sugar drop after they have been cut, and then rise again to receive a fresh slab to be cut. The levers actuating the knives may be acted on by a cam or cams, or by a crank or other arrangement, for communicating a quick reciprocating motion to them by means of a pin, as shown at H in the accompanying drawings, though a cam is preferred, as a dwell or rest in the motion of the knives may then be made after they have retired after cutting a slab of sugar, so as to give time for the cut lumps to fall away and for a fresh slab of sugar to drop into its place in the machine and rest on the flap before named, when the knives again advance and retire quickly to cut the sugar, as before.

In the accompanying drawings, Figure 1 shows a front elevation, Fig. 2 a plan, and Fig. 3 an end elevation, of the above-described machine. Fig. 4 is a part section, showing the two sets of knives A and guide-bars C. Fig. 5 shows a front view of those parts as presented to the sugar slab, and Fig. 6 shows the cross-guides without the knives.

The same letters refer to the same parts in each figure.

In Figs. 1 and 2, A A represent the knives, caused to advance and retire by the slides B B moving in guides fixed on the bed-plate of the machine. C C are horizontal and vertical bars supporting the front ends of the knives, but permitting them to open when wedged apart by the sugar. The vertical bars also enable the knives to be withdrawn from the sugar as they move backward. D D are frames with pins E E, upon which the bars are threaded, F F being springs, against which the end bars press vertically and horizontally when the knives are wedged apart. The back ends of the knives are made with T-shaped heads let into and supported by horizontal grooves in the face of the slides B B. The position of the back ends of the knives in the grooves in the slides is fixed by the vertical bars G G, which retain the T-heads. The slides B B are moved forward and backward by the levers J J, mounted on spindles acted on by levers I I. H is a pin to receive motion. The flap S receives the slice of sugar and supports it while being cut by the knives, and then opens to let the lumps fall out of the machine as the knives are drawn back.

The lumps of sugar, when cut, may be allowed to run over a sieve or grating to separate what little dust may have been made from the cut lumps.

It will be evident that the before-described machine may, if desired, be adapted for cutting the blocks or slabs of sugar into strips by providing on each side only a single set of parallel reciprocating knives.

Also, the one set of knives may be stationary and only capable of lateral separation; or for the knives on the one side of the sugar may be substituted abutment-pieces capable of lateral separation, such pieces being arranged to face either the knives or the spaces between them, and being either stationary or caused to reciprocate like the knives. They might be made to fit close together, so as to form a continuous surface when not moved apart from each other.

It is obvious that the knives, instead of being arranged in squares, as described, may be arranged in other figures, such as a rectangle, triangle, or polygon, so as to cut the sugar into pieces of corresponding forms.

One of the vertical guide-bars, at or near the center, is, by preference, fixed, in order to insure that the knives shall open out laterally to an equal extent in each direction. The knives, by preference, are a little wider apart at their back ends than at their cutting ends, so that they do not tend to separate by simple end pressure.

Although we have described the knives as placed horizontally, or nearly so, they may be placed at other angles, or vertically, in which latter case the piece of sugar must be fed in horizontally and the lumps or strips of sugar be pushed out horizontally.

In place of the support for the piece of sugar while being chopped being horizontal, there may be two such supports at forty-five degrees or other angle, and the piece of sugar may rest on both until the knives chop it.

We are aware that sugar-cutting machines have been constructed in which are employed a series of knives arranged in sets facing each other and capable of reciprocating movements for severing a slab of sugar into blocks, the severed piece being permitted to drop by gravity through the medium of movable flaps, but such, not being our invention, is hereby disclaimed.

The essential difference between our invention and the machines heretofore constructed is, that the chopping-knives can yield laterally, in addition to possessing the requisite reciprocating movement, whereby the knives act as wedges in separating the sugar into pieces, and at the same time there is provision to permit the pieces to move sidewise or apart from each other, and thereby avoid crushing the sugar as the knives advance.

Having thus described the nature of our invention and in what manner the same is to be performed, we claim—

1. In a machine for cutting sugar, the series of reciprocating and laterally-yielding knives for dividing the slabs of sugar into lumps of suitable size for ordinary use, substantially as described.

2. In a sugar-chopping machine, the combination, with the sugar-support and with the reciprocating slides, of two opposite sets of reciprocating and laterally-yielding knives fulcrumed in said slides, substantially as herein described.

3. In a sugar-chopping machine, the combination of pivoted knives or cutters A with guides C and springs F, arranged and operating as herein set forth.

In testimony whereof we have signed our names to this specification, in the presence of two subscribing witnesses, this 20th day of March, 1880.

F. B. McCREA.
E. A. COWPER.

Witnesses:
JNO. P. M. MILLARD,
JOHN DEAN.